United States Patent [19]

Carson, Jr.

[11] 3,978,022

[45] Aug. 31, 1976

[54] THERMAL STABILIZATION OF ACRYLIC POLYMERS

[75] Inventor: William F. Carson, Jr., Louisville, Ky.

[73] Assignee: Rohm and Haas Company, Philadelphia, Pa.

[22] Filed: Mar. 28, 1975

[21] Appl. No.: 563,246

Related U.S. Application Data

[63] Continuation-in-part of Ser. No. 486,292, July 8, 1974, abandoned.

[52] U.S. Cl. ............................................ 260/45.7 S
[51] Int. Cl.[2] ............................................ C08J 3/20
[58] Field of Search .................. 260/45.7 S, 89.5 S, 260/79.5 NV, 79.5 C

[56] References Cited

UNITED STATES PATENTS

| 2,396,997 | 3/1946 | Fryling | 260/79.5 R |
| 2,565,141 | 8/1951 | Marks | 260/79.5 R |

*Primary Examiner*—V.P. Hoke
*Attorney, Agent, or Firm*—Michael B. Fein

[57] ABSTRACT

This invention relates to a process for thermally stabilizing methyl methacrylate polymers and the products produced therefrom. More specifically, it refers to an improved process for stabilizing methyl methacrylate-containing polymers by adding a particular thermal stabilizer to methyl methacrylate-containing polymer prior to its extrusion and final packaging.

13 Claims, No Drawings

THERMAL STABILIZATION OF ACRYLIC POLYMERS

SUMMARY OF THE INVENTION

This invention relates to a process for thermally stabilizing methyl methacrylate polymers and the products produced therefrom. More specifically, it refers to an improved process for stabilizing methyl methacrylate-containing polymers by adding a particular thermal stabilizer to methyl methacrylate-containing polymer prior to its extrusion and final packaging.

BACKGROUND OF THE INVENTION

It is known in the art that various mercapto compounds can stabilize polyolefins and halogen-containing resins. See U.S. Pat. No. 3,144,422. It is also known from U.S. Pat. Nos. 3,364,182 and 3,801,541 that methyl methacrylate monomer can be polymerized in the presence of small amounts of a mercapto compound. It is also generally known in the art that mercapto compounds retard radical chain degradation in many types of polymers. However, even with this knowledge, there still remains a problem in finding among the many thousands of sulfur compounds the ones that most efficiently reduce the degradation of methyl methacrylate polymers. The generation of small amounts of residual monomer caused by polymer degradation during molding and extrusion results in fabricated articles that are defective and unusable. The reduced yield of acceptable articles naturally results in higher costs. In order to reduce costs, it is important to reduce as much as possible the thermal degradation of these methyl methacrylate-containing polymers.

To find a suitable stabilizer for methyl methacrylate polymers, a combination of efficiency and lack of odor and color imparted to the polymer is required. Many previously suggested thermal stabilizers are deficient in one or more of these regards, and none are as effective as those of the present invention.

DETAILED DESCRIPTION OF THE INVENTION

It is therefore an object of the present invention to provide a thermal stabilizer for methyl methacrylate polymers which has superior efficiency.

It is a further object to provide a thermal stabilizer which does not impart odor and color to the polymer.

A still further object is to provide a process for producing methyl methacrylate polymers at improved rates.

I have found that with the addition of small amounts of one or more of certain particular compounds one can obtain a surprising improvement over the prior art methods for stabilizing many of the methyl methacrylate-containing polymers. The compounds having outstanding thermal stabilizing effect on methyl methacrylate polymers are di-tertiary-alkyl disulfides.

I have found that such compounds improve the thermal stability of homopolymers of methyl methacrylate or polymers obtained from the polymerization of methyl methacrylate monomer with one or more other monomers of the formula:

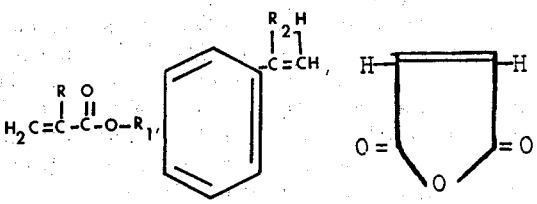

or

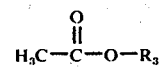

wherein
R is H or CH$_3$;
R$_1$ is H, alkyl of 1 through 4 carbon atoms cyclohexyl, alkene of 2 through 3 carbon atoms or

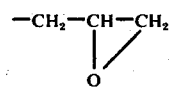

provided, however, that R and R$^1$ are not each CH$_3$ concurrently;
R$_2$ is H, CH$_3$ or CH$_2$OH; and
R$_3$ is alkene of 2 or 3 carbon atoms.

Examples of these other monomers are methyl acrylate, ethyl acrylate, propyl acrylate, butyl acrylate, cyclohexyl acrylate, cyclohexyl methacrylate, phenyl allyl alcohol, glycidyl methacrylate, styrene, α-methyl styrene, methacrylic acid, maleic anhydride, allyl acrylate, allyl methacrylate, vinyl acrylate, allyl acetate, vinyl acetate and ethyl methacrylate.

Modified methyl methacrylate polymers prepared, for example, in accordance with U.S. Pat. Nos. 3,793,402 and 3,808,180, i.e., further containing an additional multiple stage polymer, especially a methyl methacrylate-containing polymer, are also included.

The total amount of other optional (non-methyl methacrylate) monomer units in the polymer can be 0 to 50 percent by weight.

The amount of di-t-alkyl disulfide required to be added to the polymer to achieve improved thermal stability is in the range from about 0.001 to 1 percent by weight of the polymer. It is preferred to use from about 0.005 to 0.05 percent by weight thermal stabilizer for best results and it is particularly preferred to use about 0.01 percent by weight for overall best advantage.

The stabilizer can be added to the polymer either prior to or after polymerization. When the stabilizer is added to the methyl methacrylate-containing polymer after polymerization is complete, it is done either prior to or during the extrusion of the polymer to form the cube or cylindrical shaped materials that are normally sold commercially to polymer processors for molding and extrusion. The methyl methacrylate polymer granules made by any process are suitable for this stabilizing treatment. Alternatively, the methyl methacrylate polymers can be molten or in the form of spheres, cubes, irregular particlues, cylinders or in any other form suitable for feeding to an extruding machine. The granules are extruded by well-known techniques at temperatures usually in the range of 200°C. to 325°C. The extruded product is then normally chopped to a size of about one/eighth of an inch on each edge. However, depending on extrusion technique, the final product can be of any shape and can be larger or even smaller depending upon the desires of the manufacturer. The molding powder or pellets are preferably extruded into sheet, rods, tubes, and the like, or injection molded to make articles of any desired shape.

The stabilizer can be added to the granules in the amount indicated above and then the mixture can be stored for later extrusion. Alternatively, the stabilizer can be added directly in the amounts set forth above to a continuous feed of polymer immediately prior to the introduction of the polymer into the extruding device or directly to the molten polymer in the extruding device.

When the stabilizer is added to the polymer prior to polymerization, it can be added to the monomer mix or the polymer emulsion.

One of the outstanding advantages of the use of the stabilizer of the present invention is the ability for a molder to use higher melt temperatures and longer hold-up times in his molding process without fear of degradation resulting in splay. Splay is a white frosting effect from foam smeared on a molded article. The residual monomer generated foam results from polymer degradation. The higher melt temperatures enable the fabricator to process his moldings at a more rapid rate and thus under more economic conditions.

The following additional examples and comparisons with the prior art are provided to set forth the invention in still greater detail. In these examples all parts and percentages are by weight unless otherwise indicated.

EXAPLE 1a

Granules of a copolymer of 99% methyl methacrylate with 1% ethyl acrylated (molecular weight = 110,000) are blended with di-t-dodecyl disulfide at the levels shown in Table I and the blends are extruded. From the data in the table, it can be seen that the residual monomer level is considerably reduced when the di-t-dodecyl disulfide is present.

TABLE I

| Di-t-dodecyl disulfide Wt.-% | Wt.-% Residual Monomer | % Improvement Over Control |
|---|---|---|
| None (control) | 0.58 | — |
| .005 | 0.34 | 70 |
| .01 | 0.29 | 100 |
| .025 | 0.15 | 285 |

EXAMPLE 1b
(Comparative)

Substituting n-dodecyl mercaptan, the most prevalent thermal stabilizer in commercial practice, at a level of 0.1 wt. %, (a much higher level), the residual monomer was 0.5, only a 16 percent improvement over control.

EXAMPLE 2

Granules of a copolymer of 96% methyl methacrylate with 4% ethyl acrylate (molecular weight = 155,000) are blended with di-t-dodecyl disulfide at the levels shown in Table II and the blends are extruded to obtain good dispersion of the stabilizer in the polymer. Here, again, the residual monomer content is reduced when the di-t-dodecyl disulfide is present.

TABLE II

| Di-t-dodecyl disulfide Wt.-% | Wt.-% Residual Monomer | % Improvement Over Control |
|---|---|---|
| None (control) | 0.72 | — |
| .005 | 0.50 | 44 |
| .01 | 0.35 | 106 |
| .025 | 0.24 | 200 |

EXAMPLE 3

A three-stage interpolymer with the composition

| First Stage: | |
|---|---|
| Methyl methacrylate | 33.4 |
| Ethyl acrylate | 1.6 |
| Allyl methacrylate | 0.07 |
| Second Stage: | |
| Butyl acrylate | 37.0 |
| Styrene | 8.0 |
| Allyl methacrylate | 1.0 |
| Third Stage: | |
| Methyl methacrylate | 19.2 |
| Ethyl acrylate | 0.8 | is prepared in emulsion as described in U.S. Pat. No. 3,793,402. The emulsion is divided into portions. One portion is spray dried as is. To other portions is added di-t-dodecyl disulfide which has been emulsified in water using sodium dioctyl sulfosuccinate as an emulsifier and these portions are spray dried. Various amounts of di-t-dodecyl disulfide are added to portions of the spray dried interpolymer and the mixtures are tumbled to effect uniform dispersion of the stabilizer. These various portions of spray dried interpolymer are then blended with an equal weight of a methyl methacrylate/ethyl acrylate, 96/4 by weight, copolymer of molecular weight 110,000 and the blends are extruded. A portion of the unstabilized interpolymer is also blended with the copolymer and the blend is extruded in a vented extruder. A solution of di-t-dodecyl mercaptan in methyl methacrylate monomer is added to the melt in the extruder just prior to the vent.

From the residual monomer data in Table III, it can be seen that di-t-dodecyl disulfide causes a reduction in residual monomer content and that this reduction in residual monomer takes place no matter how the stabilizer is added.

TABLE III

| Di-t-dodecyl disulfide | Mode of Addition | % Residual Monomer | % Improvement Over Control |
|---|---|---|---|
| None (control) | | 0.94 | — |
| 0.005 | Stabilizer added to powder | 0.51 | 84 |
| 0.010 | " | 0.45 | 109 |
| 0.025 | " | 0.35 | 169 |
| 0.050 | " | 0.33 | 185 |
| 0.100 | " | 0.19 | 395 |
| 0.25 | " | 0.15 | 527 |
| 0.010 | Stabilizer added to emulsion | 0.40 | 135 |
| 0.025 | " | 0.30 | 213 |

TABLE III-continued

| Di-t-dodecyl disulfide | Mode of Addition | % Residual Monomer | % Improvement Over Control |
|---|---|---|---|
| 0.005 | Stabilizer added to extruder | 0.45 | 109 |
| 0.010 | " | 0.40 | 135 |
| 0.025 | " | 0.30 | 213 |

EXAMPLE 4

The following Table IV shows a comparison of the stabilizer of the invention versus n-DDM, the prevalent commercially used stabilizer, and pentaerythritol tetrakis (thioglycolate) ("PETT") shown in U.S. Pat. No. 3,801,541, all used in the polymer of Example 3 at the same level.

TABLE IV

| Compound | Stabilizer Wt. - % | % Residual Monomer | % Improvement Over Control |
|---|---|---|---|
| pentaerythritol tetrakis (thioglycolate) ("PETT") | 0.10 | 0.30 (heavy odor) | 213 |
| N-dodecyl mercaptan | 0.10 | 0.87 (slight odor) | 8 |
| d-t-dodecyl disulfide | 0.10 | 0.19 (no odor) | 395 |

EXAMPLE 5

A copolymer of 73% methyl methacrylate, 25% alpha-methylstyrene, and 2% ethyl acrylate is prepared in emulsion and spray dried. Di-t-dodecyl disulfide is added to the powder and the mixture is extruded. As is shown in Table V, the di-t-dodecyl disulfide reduces the residual monomer content.

TABLE V

| Di-t-dodecyl disulfide Wt., % | % Residual Monomer | % Improvement over Control |
|---|---|---|
| None (control) | 1.1 | — |
| 0.25 | 0.35 | 214 |
| 0.10 | 0.37 | 197 |
| 0.05 | 0.41 | 168 |
| 0.025 | 0.52 | 112 |

EXAMPLE 6

The methyl methacrylate polymer granules of Example 1a are blended with other thermal stabilizers of the invention, and the thermal stabilization efficiency is very good; namely, di-t-butyl disulfide, di-t-octyl disulfide, di-t-hexadecyl disulfide, and di-t-eicosyl disulfide at levels from 0.001 to 1 percent by weight.

EXAMPLE 7

Granules of a methyl methacrylate/ethyl acrylate (99/1) copolymer of molecular weight 110,000 were blended with stabilizer and extruded at two ates as shown in Table VI; as can be seen, the addition of the stabilizer di-t-dodecyl disulfide allows the material to be extruded at 7800 pounds per hour at the same residual monomer level obtained with polymer which is stabilized with n-dodecyl mercaptan extruded at 5000 lbs./hr. — a 56 percent improvement in extruder output. Furthermore, the amount of di-t-dodecyl mercaptan needed at the 7800 lbs./hr. level is only 1/20 the amount of n-dodecyl mercaptan needed at 5000 lbs./hr. for equivalent residual monomer.

| Stabilizer | Wt.-% | Residual Monomer At 5000 lbs./hr. | Residual Monomer At 7800 lbs./hr. |
|---|---|---|---|
| None (control) | — | 0.45 | 0.8 |
| n-dodecyl mercaptan | 0.100 | 0.35 | 0.6 |
| di-t-dodecyl disulfide | 0.005 | 0.19 | 0.35 |
| di-t-dodecyl disulfide | 0.010 | 0.12 | 0.30 |

EXAMPLE 8

This example illustrates adding the stabilizer to the monomer prior to polymerization.

Copolymers of 96 parts of methyl methacrylate with 4 parts of ethyl acrylate containing 0, 0.00005, 0.00001, and 0.0002 parts of di-t-dodecyl disulfide were prepared by bulk polymerization using 0.02 parts lauroyl peroxide, 0.0066 parts acetyl peroxide, 0.0045 part t-butyl hydroperoxide (70%) and 0.47 part n-dodecyl mercaptan on a temperature cycle of 24 hours at 65°C., 2 hours at 80°C. and 6 hours at 120°C. The finished polymer was extruded.

| Di-t-dodecyl disulfide Wt-% | Wt-% Residual Monomer | % Improvement Over Control |
|---|---|---|
| None (control) | 0.33 | — |
| 0.005 | 0.17 | 94 |
| 0.01 | 0.10 | 230 |
| 0.02 | 0.08 | 313 |

EXAMPLE 9

Copolymers of methyl methacrylate/ethyl acrylate = 96/4 ($M_v$ = 150,000) were prepared in emulsion using 0.0006 parts potassium persulfate and 0.00005, 0.0001 and 0.0002 parts di-t-dodecyl disulfide. The emulsions were spray dried to recover the polymer. The powder was then extruded to pellets.

| Di-t-dodecyl disulfide Wt-% | Wt-% Residual Monomer | % Improvement Over Control |
|---|---|---|
| None (control) | 0.6 | — |
| 0.005 | 0.45 | 33 |
| 0.01 | 0.35 | 71 |
| 0.02 | 0.30 | 100 |

I claim :

1. A composition comprising a methyl methacrylate-containing polymer containing about 0.001 to 1 percent by weight of a thermal stabilizer comprising a di-t-alkyl disulfide.

2. The composition of claim 1 wherein said thermal stabilizer is di-t-dodecyl disulfide.

3. The composition of claim 1 wherein said polymer contains about 0.005 to 0.05 percent by weight of said thermal stabilizer.

4. The composition of claim 1 further containing a multiple stage polymer.

5. The composition of claim 1 wherein said methyl methacrylate-containing polymer is a multiple stage polymer.

6. An article of manufacture comprising the composition of claim 1 in powder or granular form.

7. An article of manufacture comprising a molded article having the composition of claim 1.

8. A process for preventing thermal degradation of methyl methacrylate-containing polymers comprising including about 0.001 to 1 percent by weight of a thermal stabilizer comprising di-t-alkyl disulfide.

9. A process for extruding methyl methacrylate-containing polymers comprising adding about 0.001 to 1 percent by weight di-t-alkyl disulfide as a thermal stabilizer to the polymer and extruding.

10. The process of claim 9 wherein the thermal stabilizer is added to the polymer while the polymer is in emulsion form, before isolation of the polymer.

11. The process of claim 9 wherein the thermal stabilizer is added to the methyl methacrylate-containing polymer melt in the extruder.

12. The process of claim 9 wherein the thermal stabilizer is blended with the polymer while it is in granule or powder form.

13. The process of claim 9 wherein the thermal stabilizer is added to the monomer prior to polymerization.

* * * * *